United States Patent [19]

O'Neill et al.

[11] Patent Number: 4,935,146

[45] Date of Patent: Jun. 19, 1990

[54] METHOD FOR REMOVING ARSENIC OR SELENIUM FROM AN AQUEOUS SOLUTION CONTAINING A SUBSTANTIAL BACKGROUND OF ANOTHER CONTAMINANT

[75] Inventors: Gary A. O'Neill, Plum Borough; John W. Novak, Murrysville; Edward S. Martin, New Kensington, all of Pa.

[73] Assignee: Aluminum Company of America, Pittsburgh, Pa.

[21] Appl. No.: 271,501

[22] Filed: Nov. 15, 1988

[51] Int. Cl.$^5$ .............................................. C02F 1/42
[52] U.S. Cl. .................................. 210/684; 210/685; 210/688; 210/702; 210/906; 210/907; 210/912; 423/87; 423/508
[58] Field of Search ............... 423/87, 508, DIG. 1, 423/DIG. 2; 210/688, 684, 702, 685, 906, 907, 912, 902; 75/108

[56] References Cited

U.S. PATENT DOCUMENTS

| | | | |
|---|---|---|---|
| 3,914,375 | 10/1975 | Clark et al. | 423/43 |
| 3,933,635 | 1/1976 | Marchant | 210/50 |
| 3,966,889 | 6/1976 | Kakuta et al. | 423/510 |
| 4,130,633 | 12/1978 | Shawl et al. | 423/509 |
| 4,222,999 | 9/1980 | Weir et al. | 423/557 |
| 4,330,508 | 5/1982 | Weir et al. | 423/42 |
| 4,374,808 | 2/1983 | Weir et al. | 423/42 |
| 4,377,556 | 3/1983 | Hofirek | 423/42 |
| 4,405,464 | 9/1983 | Baldwin et al. | 210/717 |
| 4,458,030 | 7/1984 | Manabe et al. | 502/183 |
| 4,519,912 | 5/1985 | Kauffman et al. | 210/611 |
| 4,519,913 | 5/1985 | Baldwin et al. | 210/611 |
| 4,544,541 | 10/1985 | Chou et al. | 423/508 |
| 4,725,357 | 2/1988 | Downing et al. | 210/611 |
| 4,752,397 | 6/1988 | Sood | 210/662 |

FOREIGN PATENT DOCUMENTS 54-024993 8/1979 Japan.

OTHER PUBLICATIONS

R. R. Trussell et al., "Selenium Removal from Ground Water Using Activated Alumina", Aug. 1980 EPA Report.
P. Kreft et al., "Removal of Inorganic Selenium from Drinking Water Using Activated Alumina", Symposium on Selenium, pp. 97–110.
J. W. Novak et al., "Mechanisms of Metal Ion Adsorption on Activated Alumina", 1987, pp. V-35-V-52.
T. Sato et al., "Adsorption of Various Anions by Magnesium Aluminum Oxide ($Mg_{0.7}Al_{0.3}O_{1.15}$)", Ind. Eng. Chem. Prod. Res. Dev., vol. 25, No. 1, Mar. 1986, pp. 89–92.
G. Klein, "Selenium Removal Using Ion Exchange", Symposium on Selenium in the Environment, Jun. 11, 1985, pp. 1–12.

Primary Examiner—Robert L. Stoll
Assistant Examiner—Steven J. Bos
Attorney, Agent, or Firm—Gary P. Topolosky

[57] ABSTRACT

A method is disclosed for reducing the amount of a first contaminant and second contaminant in a solution to environmentally safe levels, said solution having a substantially greater amount of the first contaminant than the second contaminant. The method comprises: contacting the solution with an activated or calcined product of a compound having the formula $A_6B_2(OH)_{16}C.4-H_2O$, wherein A is a divalent metal cation, B is a trivalent metal cation and C is a mono- to tetravalent anion. The method further comprises separating the solution from the contacted product. The method is particularly useful for removing both selenium and sulfate, arsenic and sulfate, or arsenic and phosphate from a waste water stream. An unpredicted preference for selenium and arsenic, in the presence of other contaminants including sulfate and phosphate, was also shown herein.

17 Claims, 4 Drawing Sheets

ARSENIC (III) REMOVAL USING ACTIVATED HYDROTALCITE

ARSENIC (III) REMOVAL USING ACTIVATED HYDROTALCITE

COMBINED REMOVAL: Se(IV) and Se(VI)
USING ACTIVATED HYDROTALCITE

SULFATE REMOVAL USING ACTIVATED HYDROTALCITE

ARSENIC REMOVAL: COMPETITIVE EFFECTS

SELENIUM VS. SULFATE

SELENIUM VS. SULFATE (VOLUME CORRECTED)

METHOD FOR REMOVING ARSENIC OR SELENIUM FROM AN AQUEOUS SOLUTION CONTAINING A SUBSTANTIAL BACKGROUND OF ANOTHER CONTAMINANT

BACKGROUND OF THE INVENTION

The present invention relates to the removal of a particular contaminant from a waste water stream containing substantially greater amounts of another contaminant. More particularly, the invention relates to the removal of arsenic or selenium from an aqueous solution containing a high background of sulfate, phosphate, chloride and/or fluoride. The invention further relates to a method for removing multiple contaminants from a waste water stream.

Contaminants such as selenium may be found in trace amounts of waste water from power plants, particularly those using lignite as a fuel source. While selenium is usually present in small amounts, averaging from about 0.1 to about 20 ppm, such levels are still too high to permit safe environmental discharge. Current drinking water regulations require selenium levels below about 0.01 mg/L or less than about 0.01 ppm. Selenium contaminants are also present in certain types of soils. With the exposure of these soils to water, even natural water depositories may be substantially contaminated with unsafe selenium levels. The Kesterson reservoir, near Fresno, Calif., for example, was recently tested for contamination. In addition to containing unacceptable amounts of selenium, water from this reservoir contained a substantially high background of sulfates as well. One particular water sample, for example, was analyzed to contain sulfate and selenium contaminants in a ratio of about 13,500 to 1.

For most aqueous environments, selenium exists in two different valence states: Se(IV) or $Se^{4+}$, usually present as $HSeO_3^-$, or $SeO_3^{2-}$ (selenite); and Se(VI) or $Se^{6+}$, usually present as $SeO_4^{2-}$ (selenate). Both valences of selenium are not typically responsive to the same removal means. For example, it is well known to remove Se(IV) from a waste water using ferric chloride or alum in a coagulation technique. The same treatment does not significantly affect Se(VI) concentrations, however. In an EPA report entitled "Selenium Removal from Ground Water Using Activated Alumina", Trussell et al. stated that for the same operating conditions and water compositions, Se(VI) was removed at about one-tenth the rate as Se(IV). This difference in adsorption behavior may be due, in part, to the chemical similarity of $SeO_4^{2-}$ and sulfate ions. As such, there is no predictable preference for removing Se(VI) or selenate from a high background of sulfates, phosphates, chlorides and/or fluorides.

Contact with an activated alumina is known to remove selenites from a solution. This method even serves as an effective pretreatment according to the present invention. In a paper entitled "Removal of Inorganic Selenium from Drinking Water by Activated Alumina", Kreft et al. observed that this adsorbent's capacity for removing Se(IV) was much higher than its capacity for Se(VI) removal. Kreft et al. further noted that sulfates and biocarbonates heavily interfere with Se(VI) adsorption at concentrations greater than 100 mg/L. An extensive thermochemical study by Novak et al. (Lewis Publ., Inc., Chelsen, Mich., 1987: "Mechanisms of Metal Ion Adsorption on Activated Alumina") confirmed the observations of Kreft and provided theoretical explanations based on heats of adsorption.

Arsenic occurs in one of two valence states, either $As^{3+}$ or $As^{5+}$. Like selenium, arsenic removal from waste water becomes complicated when high backgrounds of other contaminants are also present. For example, in the aqueous streams associated with phosphate mining or with the production of certain phosphate fertilizers and pesticides, environmentally unacceptable amounts of As(III) and As(V) exist in a substantially high phosphate or sulfate background. Depending on the selectivity of the adsorbent used, a substantial amount of the background contaminant may have to be adsorbed before arsenic is sufficiently removed from the stream. It would therefore be desirable to develop a process which may selectively remove selenium or arsenic anions from waste water when substantially greater quantities of other contaminants, such as phosphates, sulfates, fluorides and chlorides, are also present.

Various methods are known for removing selenium from particular aqueous solutions. For example, Clark et al. U.S. Pat. No. 3,914,375 shows a method for removing selenium from a copper solution. Marchant U.S. Pat. No. 3,933,635 removes selenium from acidic waste water and Kakuta et al. U.S. Pat. No. 3,966,889 claims a process for recovering selenium from combustion waste gases. Shawl et al. U.S. Pat. No. 4,130,633 shows a method for removing and recovering selenium from a urethane solution. In Weir et al. U.S. Pat. Nos. 4,222,999, 4,330,508 and 4,374,808, various processes for removing Se(IV) and/or Se(VI) from copper sulfate or copper-nickel sulfate solutions are disclosed.

Hofirek U.S. Pat. No. 4,377,556 claims another process for removing dissolved selenium from a copper sulfate solution. The process includes treating the solution to a temperature of at least about 140° C. with a stoichiometric excess of sulfur dioxide or sulfite solution. In Chou et al. U.S. Pat. No. 4,544,541, a process is shown for removing Se(VI) from a nickel, cobalt or copper sulfate solution, said process including treating the solution with an effective amount of a metal hydride, metal borohydride or ammonia borane, and with finely divided nickel, cobalt or copper metal. Baldwin et al. U.S. Pat. No. 4,405,464 shows another process for reducing the selenium concentration of an aqueous solution by admixing a quantity of metallic iron into the solution for reducing at least some Se(VI) ions to the (+4) oxidation state.

Two commonly assigned references, U.S. Pat. Nos. 4,519,912 and 4,519,913, disclose removing water soluble selenium by passing solution through a treatment zone containing a population of at least one bacteria from the genus Clostridium. Downing et al. U.S. Pat. No. 4,725,357 removes dissolved selenium from waste water by treating the water in a reactor containing a microbial biomass and a biomass nutrient. This treatment, which occurs in the substantial absence of free oxygen, captures selenium in particles larger than those originally present.

Other general methods are known for separating individual anions from solution with hydrotalcite. Manabe et al. U.S. Pat. No. 4,458,030, for example, shows a composite adsorbent useful for removing $AsO_4^{-3}$ from an aqueous solution. The adsorbent consists of 5-95 wt. % hydrotalcite or calcined hydrotalcite and a balance of activated carbon. Sood U.S. Pat. No. 4,752,397 claims a process for purifying an aqueous solution containing one or more heavy metal ions, including arsenic and selenium, by passing the solution through an adsorbent containing at least about 20 wt. % activated hydrotalcite.

In Japanese Patent Application No. 54-24993, there is shown a method for removing certain individual ions, such as arsenic and selenium (among others), from a solution. The method uses hydrotalcite having the formula $XMgO.Al_2O_3.YCO_2.ZH_2O$ wherein X represents 1–10, Y represents 0.4–2.5 and Z represents 4–20. The method may also proceed with calcined hydrotalcite or with a mixture of both products. In a 1986 article by Sato et al. entitled, "Adsorption of Various Anions by Magnesium Aluminum Oxide ($Mg_{0.7}Al_{0.3}O_{1.15}$)", the adsorptive behavior of a thermally dehydrated synthetic hydrotalcite was studied relative to certain divalent anions including phosphates and sulfates. Based on these references, the Kreft et al. teaching that Se(VI) adsorption onto activated alumina is hampered by the presence of excess sulfate, and on individual adsorption isotherms for hydrotalcite-based products, it is clear that such products may be used to individually remove arsenic, selenium, phosphate or sulfate from a solution. None of the foregoing references teach or show using activated hydrotalcite to remove multiple contaminants from a solution, especially one which contains a substantial background of sulfate or phosphate, and only minor amounts of arsenic or selenium. Rather, from the individual isotherms for activated hydrotalcite accompanying this invention (FIGS. 1A through 1C), one might conclude that lower contamination levels of arsenic and selenium would be removed at a much slower kinetic rate than the high background of other contaminant. One might further conclude that substantially all divalent anions present would have to be removed before this adsorbent would remove any As(III)/As(V) or Se(IV)/Se(VI) present. As learned from this invention, however quite the opposite is true.

SUMMARY OF THE INVENTION

It is a principal object of this invention to provide a method for reducing the amount of multiple contaminants present in an aqueous solution, particularly a waste water stream. It is a further object to provide a method for reducing the amount of a first and second contaminant in a solution containing a substantially greater amount of the first contaminant than the second contaminant. It is still a further object to provide a method for selectively removing arsenic or selenium from an aqueous stream when other anionic contaminants are present in much higher background concentrations.

It is still a further object to provide means for removing substantially all Se(VI) or selenate from a waste water stream. It is another object to provide means for rapidly settling arsenic or selenate out of a phosphate- or sulfate-contaminated solution using relatively uncomplicated, yet efficient steps or recitations.

In accordance with the foregoing objects and advantages, there is provided a method for reducing the amount of a first and second contaminant in a solution, said first contaminant being present in substantially greater amounts than the second contaminant. The method comprises contacting the solution with an activated or calcined product of a compound having the formula $A_wB_x(OH)_yC_z.nH_2O$, wherein A represents a divalent metal cation, B represents a trivalent metal cation, C represents a mono- to tetravalent anion, and w, x, y, z, and n satisfy the following: $0 \leq z \leq x \leq 4 \leq w \leq \frac{1}{2}y$ and $3/2x \leq n \leq 12$. The method then proceeds by separating the solution from the contacted product. On a preferred basis, solution-product contact consists of adding a sufficient amount of powdered product directly to the solution. Alternatively, the same powder can be premixed in an appropriate solvent before being added to waste water. When conditions allow, solution may also be passed through a containment, such as a column or the like, which has been packed or otherwise loaded with this adsorbent product. Contacted product is then preferentially removed from the solution through filtration, gravity settling, centrifugation or combinations of the foregoing.

There is further disclosed a method for removing combinations of arsenic and sulfate, arsenic and phosphate, or selenium and sulfate from a solution. The method works especially well for removing both selenate (Se(VI)) and sulfate from a contaminated stream.

BRIEF DESCRIPTION OF THE DRAWINGS

Further features, other objects and advantages of this invention will become clearer from the following detailed description of preferred embodiments made with reference to the drawings in which.

DETAILED DESCRIPTION OF THE PREFERRED EMBODIMENTS

Figure 1A:
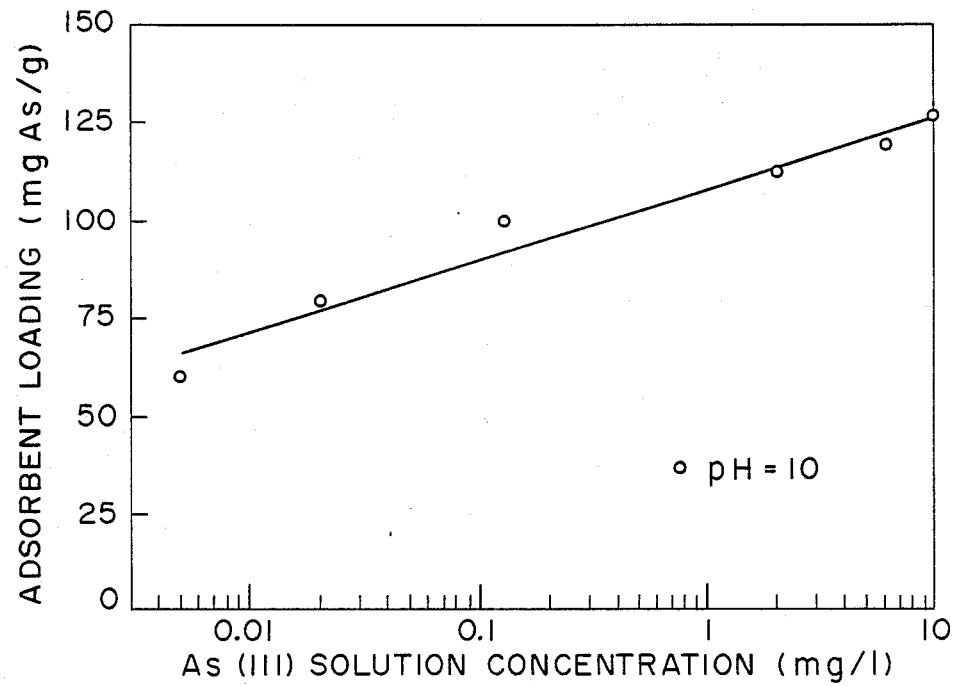
FIG. 1A is a graph showing the adsorption isotherm for removing only As(III) from a solution with an activated hydrotalcite product.

In the detailed description of the preferred embodiments which follows, repeated reference is made to the adsorption or removal of selenium and sulfate from waste water streams using sufficient amounts of an activated or calcined product of a hydrotalcite compound. It is to be understood, however, that the invention may also be practiced with other compounds from the same basic family, said family consisting of any compound having the formula: $A_wB_x(OH)_yC_z.nH_2O$, wherein A represents a divalent metal cation, B represents a trivalent metal cation, C represents a mono- to tetravalent anion, and w, x, y, z, and n satisfy the following: $0 \leq z \leq x \leq 4 \leq w \leq \frac{1}{2}y$ and $3/2x \leq n \leq 12$. Preferred compounds from this family have also been identified by the more specific formula: $A_6B_2(OH)_{16}C.4H_2O$, wherein A is selected from the group consisting of: $Mg^{2+}$, $Ni^{2+}$, $Fe^{2+}$ and $Zn^{2+}$; B is selected from $Al^{3+}$, $Fe^{3+}$ and $Cr^{3+}$; and C is preferably selected from the list of anions which includes: $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$. Some individuals refer to any compound which satisfies the foregoing formulae as a "hydrotalcite". Others, however, divide this family of compounds into various subgroups depending upon the divalent and trivalent cations which comprise every other layer. For example, pyroaurites have the basic formula $Mg_6Fe_2OH_{16}CO_3.4H_2O$. (These compounds have also been referred to as "sjogrenites".) Takovites, on the other hand, consist essentially of a compound having the formula $Ni_6Al_2OH_{16}CO_3.4H_2O$.

In accordance with this invention, the term "hydrotalcite" shall mean any natural or synthetic compound which satisfies the formula: $Mg_6Al_2(OH)_{16}CO_3$ $6MgO.Al_2O_3.CO_2.12H_2O$. In its more ionic form, hydrotalcite may be rewritten as: $[Mg_6Al_2(OH)_{16}]^{2+}.[CO_3]^{2-}.4H_2O$.

The main structural unit for hydrotalcite consists essentially of sheets of brucite, a magnesium hydroxide, $Mg(OH)_2$. By substituting a trivalent aluminum cation for some fraction of the magnesium ions in these sheets, layers of magnesium and aluminum components are created which still maintain the desired structure. To compensate for any resulting charge imbalances, additional anions (as designated by the letter C in the preceding formulae) are intercalated between Mg-Al layers and into this structure. Through the formation of hydrogen bonds, these anions and water molecules form interlayers of $(C.nH_2O)$ between the brucite-like sheets. The anion with the greatest affinity for combining with brucite to form hydrotalcite is carbonate, $(CO_3)^{2-}$.

Hydrotalcite, itself, exists as both a natural and synthetic compound. Naturally occurring deposits of this mineral have been found in Snarum, Norway and in the Ural Mountains. Typical occurrences are in the form of serpentines, talc schists, or as an alteration product of spinel where, in some cases, hydrotalcite forms as a pseudomorph of the spinel. Like most ores and compounds, natural hydrotalcite is virtually impossible to find in a totally pure state. Natural deposits typically contain one or more other minerals including, but not limited to, penninite and muscovite, or combinations of several undesirable heavy metal ions. Conventional practices recognize that it is virtually impossible to remove all such incidental elements and impurities from this product. In any event, known deposits of natural hydrotalcite remain very limited.

Several methods for making a pure, synthetic hydrotalcite have been disclosed. Such synthetic products may be produced as a fine powder, in $-20$ mesh granules, or as ⅛-inch diameter extrudates, among other forms. U.S. Pat. No. 3,539,306, for example, makes a hydrotalcite-like product by selecting an aluminum component from aluminum hydroxide, aluminum-amino acid salts, aluminum alcoholate, water soluble aluminates, aluminum nitrate and aluminum sulfate. This component is then mixed in an aqueous medium maintained at a pH of 8 or more with a magnesium component selected from magnesium oxide, magnesium hydroxide and water-soluble magnesium salts; and a carbonate ion-containing compound. The resulting product is then used as an antacid in said reference.

Once collected or synthetically formed, hydrotalcite is preferably subjected to a heat treatment for producing a better, more efficient adsorbent product. Such heat treatment may be carried out in any conventional or newly-developed heating medium maintained at one or more temperatures between about 400°–650° C., although temperatures as low as 300° C. may also suffice. Preferred activation temperatures between about 450°–500° C. tend to maximize adsorbent surface area and pore volume, while heating to temperatures at or above 800° C. appears to detrimentally affect adsorptivity. At the foregoing preferred temperatures, a porous skeletal structure is produced since at least some, if not all, water and carbonate ions are expelled from the hydrotalcite. The resulting adsorbent product has an average pore diameter of about 55Å with some pores as large as about 170Å. Its skeletal (or solid component) density is about 2.9 g/cm$^3$ and its total pore volume, about 0.3 cm$^3$/g. Upon activation or partial calcination, the specific surface area for this product, as determined by the BET nitrogen adsorption method, increases from about 20 m$^2$/g to between about 50–300 m$^2$/g.

In preferred embodiments of this invention, arsenic or selenium is removed from a solution containing another major contaminant by contacting the solution with a product consisting essentially of an activated hydrotalcite. By use of the term "consisting essentially of", it is meant that the product should contain at least about 85% or 90%, and more preferably, greater than about 95% or 98% of a hydrotalcite which has been activated (or at least partially calcined). It is to be understood, however, that physical processes are not often perfect such that every last vestige of incidental elements and impurities may be omitted from a compound which would still be considered suitable for use as an adsorbent according to the invention. In its dehydrated form, activated hydrotalcite is believed to resemble a product having the formula: $Mg_6Al_2O_8(OH)_2$.

The amount of a first and second contaminant in a solution is significantly reduced according to the invention through contact with an activated or calcined product of hydrotalcite, or a hydrotalcite-like compound. Although the solution contains substantially more first contaminant than second contaminant, the invention nevertheless manages to reduce second contaminant content by accelerating the kinetic rate at which second contaminant is adsorbed when such excesses of first contaminant are also present. The method then proceeds by separating the solution and contacting product. Preferably, only compound which is saturated (or fully loaded) with contaminants should be removed from the solution while undesirable levels of contaminants remain. After the level of both contaminants is reduced to an environmentally acceptable level, the remainder of unused product may be separated from the solution, perhaps for possible reuse.

Activated or calcined hydrotalcite may be added directly to the solution to be treated in a free-flowing, powdered form. The amount of adsorbent powder needed to remove substantially all contaminant from a given solution may be predetermined by externally testing a representative sample of the solution. Alternatively, arsenic or selenium may be rapidly settled out of a high phosphate or sulfate solution by combining the same powder and a solvent, preferably water, to form a slurry; then adding a sufficient amount of this slurry to the solution.

After adsorption, contaminant-saturated product should be removed from the solution by one or more known, or subsequently developed, techniques including filtration, gravity settling and centrifugation. Activated hydrotalcite products may also be combined with one or more binder materials, before being extruded, formed or otherwise shaped into larger particles, including granules or the like. Such large particles may then be used to fill a column, fluidized bed or other containment device through which solution may be passed. With appropriate binders, it may also be possible to form solution filters from these same activated hydrotalcite particles.

The preceding methods are especially useful in removing selenium, particularly Se(VI), from a solution having a high background of second contaminant. In situations where activated hydrotalcite is specifically used to lower the selenate content of a solution, the method of this invention may include a material pretreatment for removing substantially all Se(IV) or selenite. It is to be understood, however, that the invention may also be used to lower selenite content, or both selenite and selenate content. The invention may also be used to preferentially remove arsenic, regardless of valence state, from a solution containing one or more other contaminants. For example, the method of this invention may be used to remove As(III) and As(V) from a solution which also contains both sulfates and chlorides. The invention may also remove arsenic or selenium from a solution containing a high phosphate background. Depending on the pH of this solution, these phosphates may be monovalent ($H_2PO_4^{2-}$), divalent ($HPO_4^{2-}$) or trivalent ($PO_4^{3-}$).

Preferred methods of this invention work especially well at lowering aqueous selenium or arsenic contents to environmentally acceptable levels, even though substantial quantities of at least one other contaminant are present. It is believed that these methods function by near simultaneously adsorbing both contaminants into the basic hydrotalcite structure during rehydration.

Figure 1B:
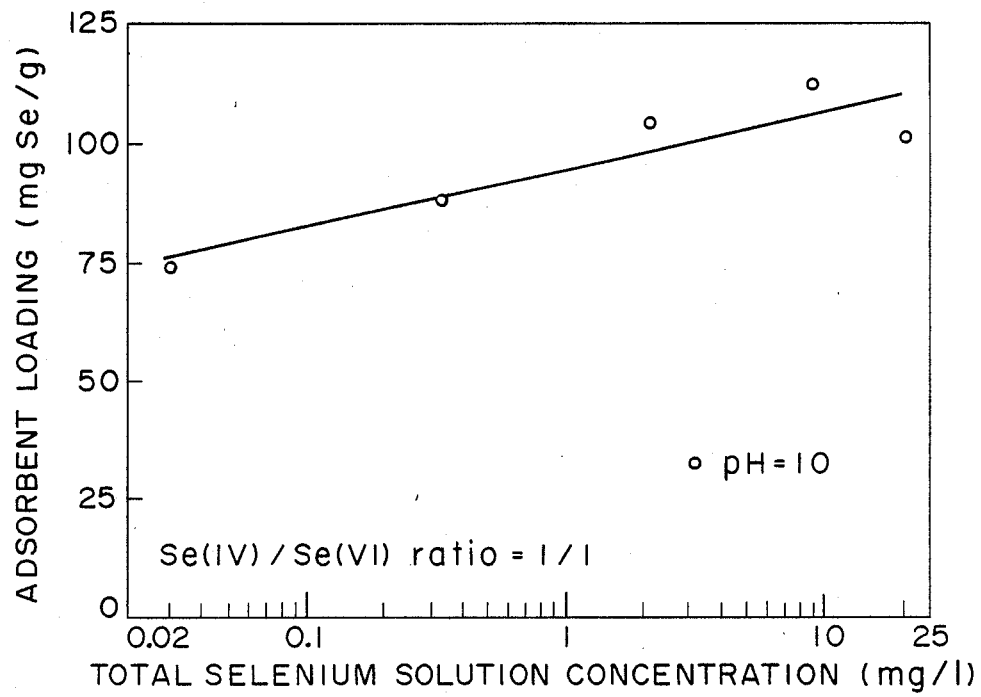
FIG. 1B is a graph showing the adsorption isotherm for removing both Se(IV) and Se(VI) from a solution with an activated hydrotalcite product.
Figure 1C:
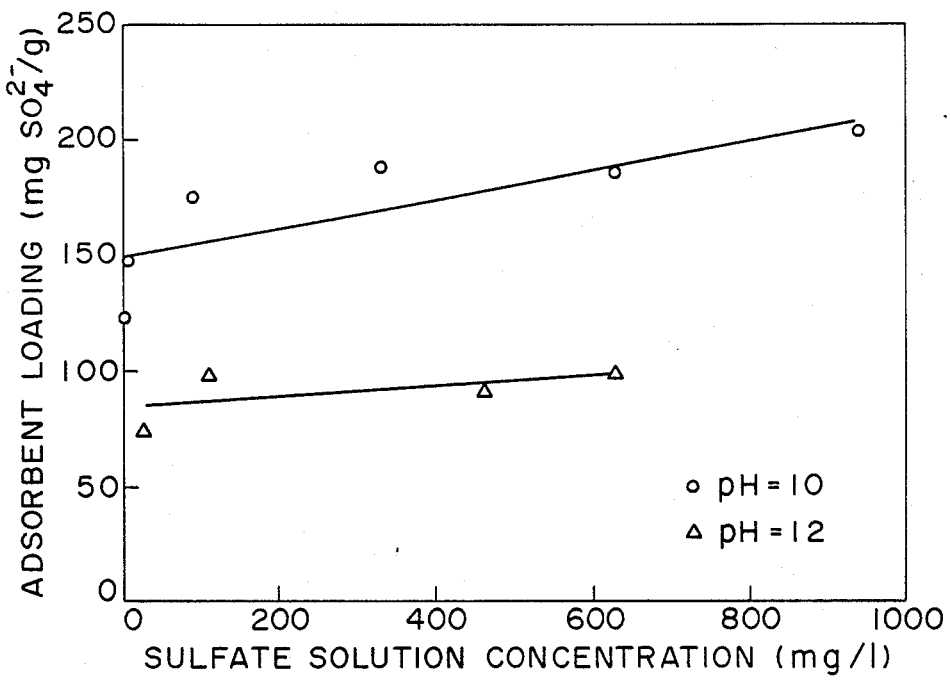
FIG. 1C is a graph showing the adsorption isotherm for removing only sulfate from a solution with an activated hydrotalcite product at various solution pH's.

In the accompanying figures, adsorption isotherms were generated for waste water contaminants on an individual basis. Particularly, at FIG. 1A, there is shown the adsorption isotherm for removing As(III) from a solution with activated hydrotalcite. FIG. 1B shows the removal of Se(IV) and Se(VI) from a solution at various adsorbent loadings. FIG. 1C shows the extent to which a hydrotalcite-based adsorbent removes only sulfate contaminant from a solution at pH's of 10 and 12.

Figure 2:
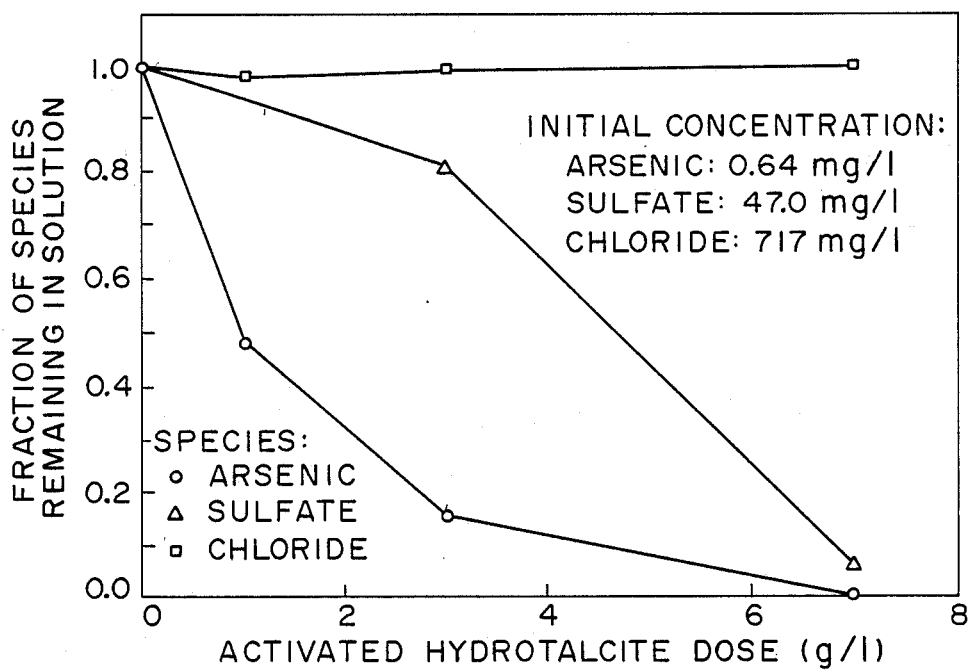
FIG. 2 is a graph showing the fraction of arsenic, sulfate and chloride ions remaining in solution after treatment according to one embodiment of the invention.

FIG. 2 shows the extent to which this invention has adsorbed arsenic and sulfate from a solution containing an initial concentration of 0.64 mg/L arsenic, 47.0 mg/L sulfate and 717 mg/L chloride. Despite the significantly high chloride background for this solution, the final arsenic and sulfate levels are both substantially reduced. More specifically, arsenic is preferentially removed from the solution, after which the removal of substantially all sulfate anions occurs. Once all higher volume anions are removed, excess adsorbent will begin lowering the halide concentration of the solution.

Figure 3A:
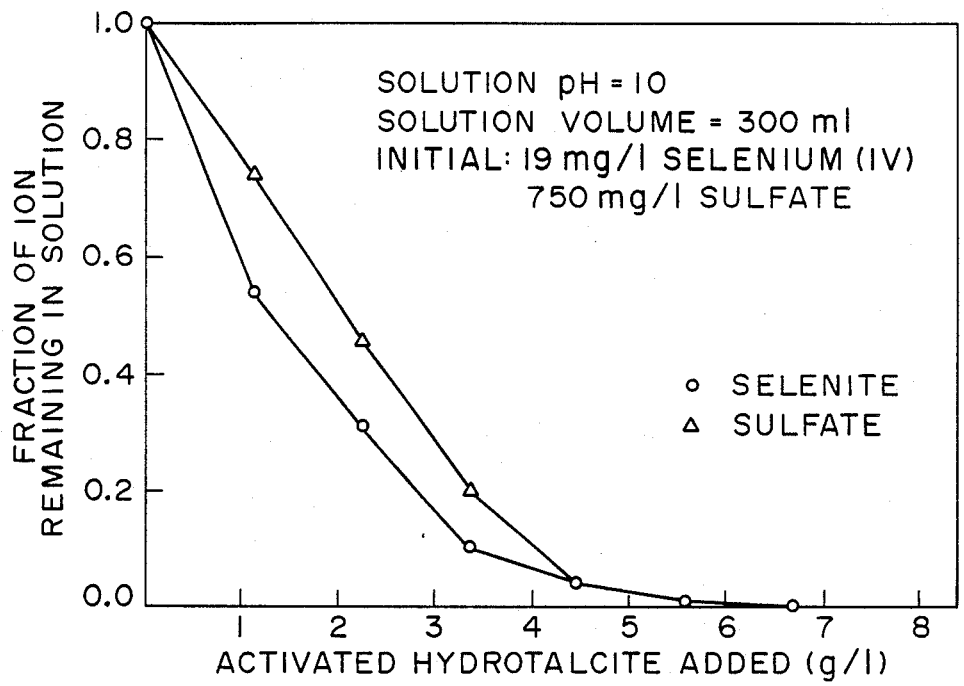
FIG. 3A is a graph showing the fraction of selenite and sulfate ions remaining in solution after treatment according to the invention.
Figure 3B:
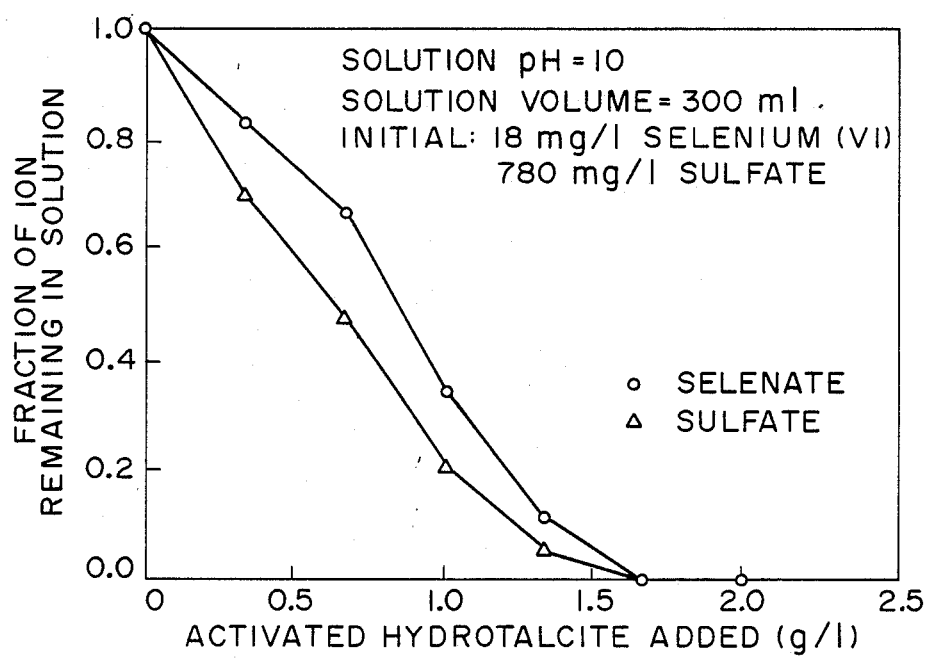
FIG. 3B is a graph showing the fraction of selenate and sulfate ions remaining in solution after treatment according to the invention.

FIGS. 3A and 3B show the extent to which the invention removes from solution selenite/sulfate and selenate/sulfate ions, respectively. The ratio of selenium to sulfate in these initial solutions was intended to approximate those from solutions actually found in nature.

The following example is provided by way of illustration. It is not intended to limit the scope of this invention in any manner, however.

Example

A sufficient amount of selenium-contaminated water was removed from a power plant process storm lake near Tatum, Tex. As received, the water was analyzed to contain 1,337 mg/L of sulfate and 0.2 mg/L of selenium. The initial pH was measured at 9.4. In order to reduce the contamination level of this water, various samples were treated to different dosages of activated hydrotalcite for various contact times ranging from 30 minutes to about 2 hours. In each test, activated hydrotalcite product was added as a 25 wt. % slurry with deionized water. Had the same product been added to the solution in pure powder form, it is theorized that only about 15 to 30 minutes of additional contact time would have been needed to yield the same performance results as those achieved through slurry addition.

For each evaluation reported below, about 300 ml of lake water was treated according to the invention. A slurry of activated hydrotalcite was then added to this solution, covered and blanketed with nitrogen to limit the amount of carbon dioxide picked up from the air, said carbon dioxide having the ability to reduce the adsorption capacity of activated hydrotalcite for other contaminants. After treatment for the preferred contact times shown in the following table, samples were drawn from the solution through a 0.22 micron filter, then sent away for analysis. Specifically, selenium content was analyzed by graphite furnace atomic adsorption spectroscopy and sulfate analysis was done by precipitation with barium through barium chloride addition. The solution pH for each water sample was then measured and recorded as follows:

TABLE

| Amount of Activated Hydrotalcite Added (g/L) | Final Corrected Sulfate Concentration (mg/L) | Final Selenium Concentration (mg/L) | Final Volume (mL) | Corrected Selenium (mg/L) | Final pH |
| --- | --- | --- | --- | --- | --- |
| 30-Minute Contact Time | | | | | |
| 8.3 | 939 | 0.060 | 380 | 0.076 | 11.4 |
| 16.7 | 649 | 0.055 | 404 | 0.074 | 11.7 |
| 25.0 | 332 | 0.040 | 387 | 0.052 | 11.7 |
| 33.3 | 102 | <0.010 | 437 | <0.015 | 11.7 |
| 1-Hour Contact Time | | | | | |
| 8.3 | 921 | 0.075 | 361 | 0.090 | 11.7 |
| 16.7* | 570 | 0.055 | 363 | 0.067 | 11.7 |
| 25.0 | 279 | 0.040 | 404 | 0.054 | 11.7 |
| 33.3* | 61 | 0.010 | 401 | 0.013 | 11.8 |
| 2-Hour Contact Time | | | | | |
| 8.3 | 781 | ** | 365 | ** | 11.4 |
| 16.7 | 400 | 0.050 | 381 | 0.064 | 11.8 |
| 25.0 | 63 | 0.015 | 379 | 0.019 | 11.7 |
| 33.3 | 8 | 0.015 | 408 | 0.020 | 11.9 |

*Average of 2 tests
**Not available

Figure 4A:
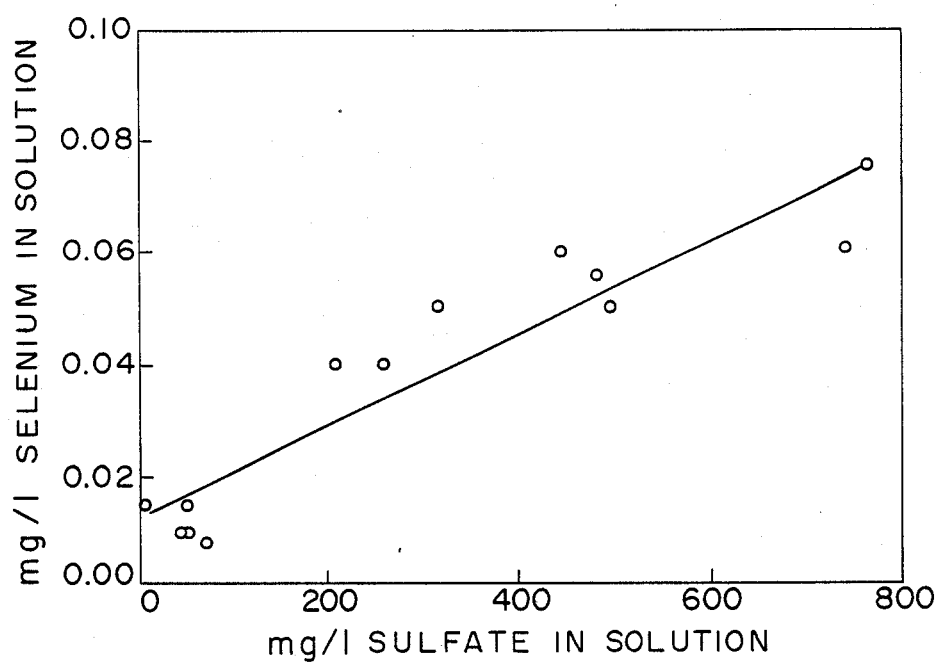
FIG. 4A is a graph showing the amount of selenium and sulfate remaining in solution after an exemplary treatment according to the invention.
Figure 4B:
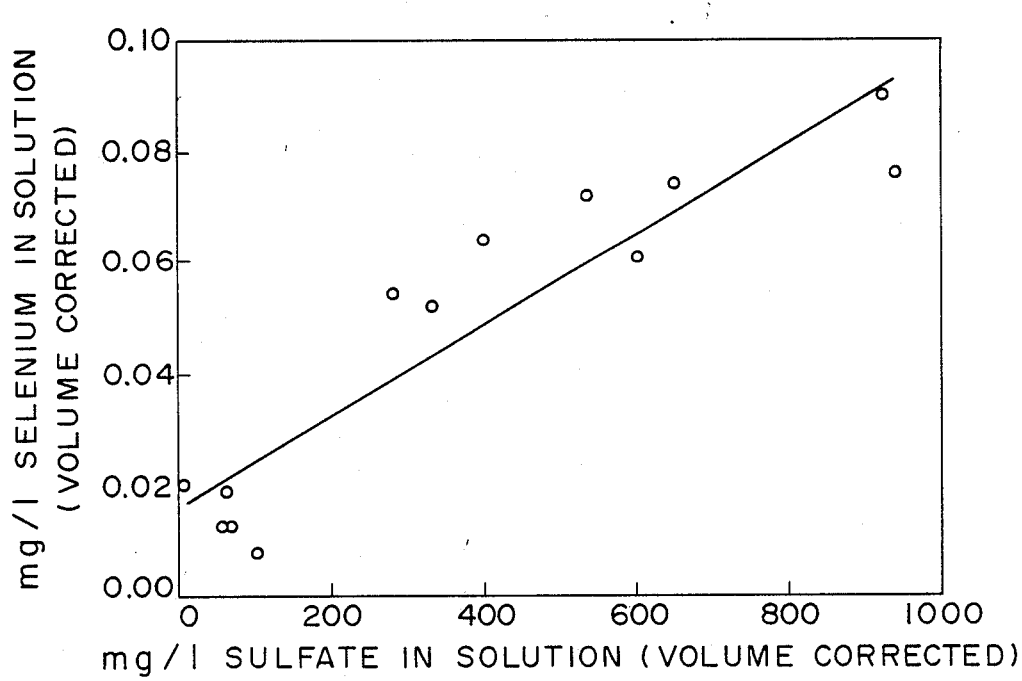
FIG. 4B is a graph showing the same experimental data from FIG. 4A after volume correction for dilution effects.

FIG. 4A is a graph comparing selenium versus sulfate concentration (uncorrected for dilution) for the foregoing experiments. FIG. 4B is a plot of the same experimental data after total concentrations were mathematically adjusted to account for any dilution through: (a) the addition of an activated hydrotalcite in slurry form; and (b) any washing water used to deliver this slurry to the solution.

Having described the presently preferred embodiments, it is to be understood that the present invention may be otherwise embodied within the scope of the appended claims.

What is claimed is:

1. A method for reducing the amount of first contaminant and second contaminant in a solution, said first contaminant selected from phosphate, sulfate and mixtures thereof, said second contaminant selected from arsenic, selenium and mixtures thereof, said solution having a greater amount of the first contaminant than the second contaminant and said method selectively reducing the level of second contaminant in solution to below about 0.01 ppm, said method comprising:
   (a) contacting the solution with an activated or calcined product of a compound having the formula $A_w B_w(OH)_y C_z \cdot nH_2O$, wherein A represents a divalent metal cation, B represents a trivalent metal cation, C represents a mono- to tetravalent anion, and w, x, y, z, and n satisfy the following: $0 \leq z \leq x \leq 4 \leq w \leq \frac{1}{2}y$ and $3/2w \leq n \leq 12$, said product adsorbing first contaminant and selectively adsorbing second contaminant from the solution; and
   (b) separating the solution and the contacted product.

2. A method as set forth in claim 1 wherein the compound has the formula: $A_6B_2(OH)_{16}C \cdot 4H_2O$.

3. A method as set forth in claim 2 wherein A is selected from $Mg^{2+}$, $Ni^{2+}$, $Fe^{2+}$ and $Zn^{2+}$; B is selected from: $Al^{3+}$, $Fe^{3+}$ and $Cr^{3+}$; and C is selected from $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$.

4. A method as set forth in claim 3 wherein the compound is selected from: natural hydrotalcite, synthetic hydrotalcite, pyroaurite and takovite.

5. A method as set forth in claim 1 wherein the second contaminant consists essentially of selenate.

6. A method as set forth in claim 1 wherein step (a) includes:
   adding a sufficient amount of product to the solution for lowering the level of first contaminant present and removing substantially all second contaminant therein.

7. A method as set forth in claim 1 wherein step (a) includes:
   passing the solution through a contaminant of the product.

8. A method as set forth in claim 1 wherein step (b) includes:
   removing contacted product from the solution through one or more of: filtration, gravity settling and centrifugation.

9. A method for treating a solution containing a first contaminant selected from phosphate, sulfate, chloride and fluroide, and a second contaminant selected from arsenic and selenium, said method comprising:
   (a) contacting the solution with an activated or calcined product of a compound having the formula: $A_6B_2(OH)_{16}C \cdot 4H_2O$, wherein A represents a divalent metal cation, B represents a trivalent metal cation, and C represents a mono- to tetravalent anion to adsorb first contaminant and selectively adsorb second contaminant; and
   (b) separating the solution from the contacted product.

10. A method as set forth in claim 9 wherein A is selected from $Mg^{2+}$, $Ni^{2+}$, $Fe^{2+}$ and $Zn^{2+}$; B is selected from: $Al^{3+}$, $Fe^{3+}$ and $Cr^{3+}$; and C is selected from $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$, and $Fe(CN)_6^{4-}$.

11. A method as set forth in claim 10 wherein the compound is selected from: natural hydrotalcite, synthetic hydrotalcite, pyroaurite and takovite.

12. A method for selectively adsorbing arsenic or selenate from an aqueous solution containing one or more contaminants selected from: phosphate, sulfate, chloride and fluoride, said method comprising:
   (a) combining an activated hydrotalcite with a solvent to form a slurry; and
   (b) adding a sufficient amount of the slurry to the solution to remove arsenic or selenate therefrom.

13. A method for removing both selenium and sulfate contaminants from a waste water stream, said method comprising:
   (a) contacting the stream with an activated or calcined product of a compound having the formula $A_w B_x(OH)_y C_z \cdot nH_2O$, wherein A represents a divalent metal cation, B represents a trivalent metal cation, C represents a mono- to tetravalent anion, and w, x, y, z, and n satisfy the following: $0 \leq z \leq x \leq 4 \leq w \leq \frac{1}{2}y$ and $3/2x \leq n \leq 12$; and
   (b) removing contacted product from the stream.

14. A method as set forth in claim 13 which further comprises:
   pretreating the stream with a material for removing substantially all selenium(IV) therefrom prior to recitation (a).

15. A method as set forth in claim 13 wherein the selenium contaminant consists essentially of selenium-(IV).

16. A method for removing both arsenic and sulfate contaminants from a waste water stream, said method comprising:
   (a) contacting the stream with an activated or calcined product of a compound having the formula $A_w B_x(OH)_y C_z \cdot nH_2O$, wherein A represents a divalent metal cation, B represents a trivalent metal cation, C represents a mono- to tetravalent anion, and w, x, y, z, and n satisfy the following: $0 \leq z \leq x \leq 4 \leq w \leq \frac{1}{2}y$ and $3/2x \leq n \leq 12$; and
   (b) removing contacted product from the stream.

17. A method for removing both arsenic and phosphate contaminants from a waste water stream, said method comprising:
   (a) contacting the stream with an activated or calcined product of a compound having the formula $A_w B_x(OH)_y C_z \cdot nH_2O$, wherein A represents a divalent metal cation, B represents a trivalent metal cation, C represents a mono- to tetravalent anion, and w, x, y, z, and n satisfy the following: $0 \leq z \leq x \leq 4 < w \leq \frac{1}{2}y$ and $3/2x \leq n \leq 12$; and
   (b) removing contacted product from the stream.

* * * * *

UNITED STATES PATENT AND TRADEMARK OFFICE
CERTIFICATE OF CORRECTION

PATENT NO. : 4,935,146  Page 1 of 2
DATED : June 19, 1990
INVENTOR(S) : Gary A. O'Neill, John W. Novak, Edward S. Martin It is certified that error appears in the above-identified patent and that said Letters Patent is hereby corrected as shown below:

| | |
|---|---|
| Col. 5, line 19 | In the formula, after "$CO_3$", insert -- $\cdot 4H_2O$, or, as rewritten: -- |
| Col. 7, line 32 | After "monovalent", change "$(H_2PO_4^{2-})$" to --$(H_2PO_4^{-})$-- |
| Claim 1, Col. 9, line 13 | In the formula, change "$B_w$" to --$B_x$-- |
| Claim 1, Col. 9, line 17 | Change "3/2w" to --3/2x-- |
| Claim 7, Col. 9, line 43 | Change "contaminant" to --containment-- |
| Claim 9, Col. 9, line 53 | Change "fluroide" to --fluoride-- |

UNITED STATES PATENT AND TRADEMARK OFFICE
CERTIFICATE OF CORRECTION

PATENT NO. : 4,935,146                         Page 2 of 2

DATED : June 19, 1990

INVENTOR(S) : Gary A. O'Neill, John W. Novak, Edward S. Martin

It is certified that error appears in the above-identified patent and that said Letters Patent is hereby corrected as shown below:

Claim 15,
Col. 10, line 37        Change "selenium(IV)" to --selenium(VI)--

Claim 17,
Col. 10, line 58        Change "$<$ w" to --$\leq$ w--

Signed and Sealed this

Thirty-first Day of December, 1991

*Attest:*

HARRY F. MANBECK, JR.

*Attesting Officer*            *Commissioner of Patents and Trademarks*